N. W. STORER.
MEANS FOR REDUCING COMMUTATOR FLASHING IN ROTARY CONVERTERS.
APPLICATION FILED MAR. 13, 1918. RENEWED JULY 9, 1921.
1,392,088.  Patented Sept. 27, 1921.
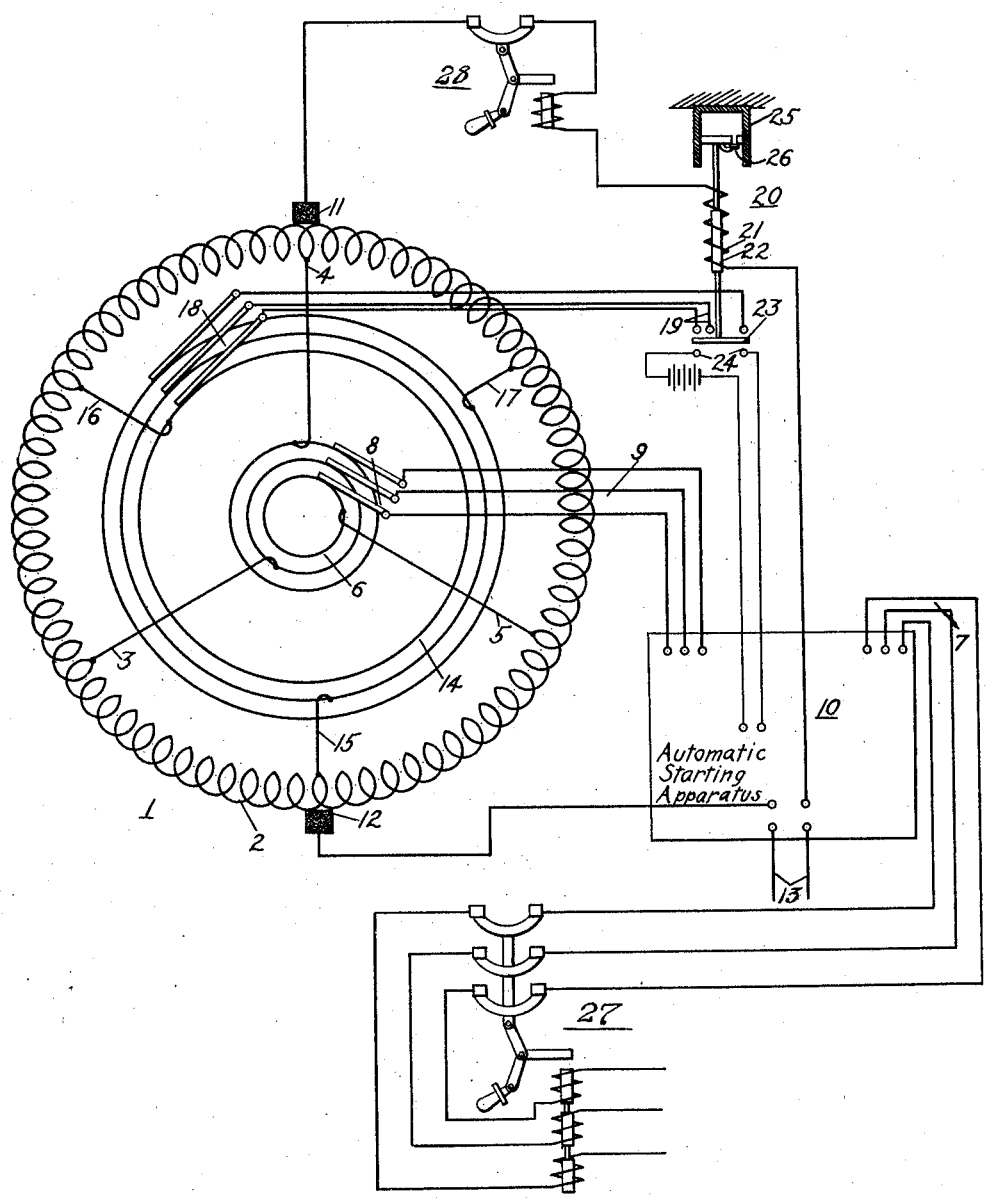
WITNESSES:
W. S. Reece
D. C. Davis.
INVENTOR
Norman W. Storer
BY
ATTORNEY

UNITED STATES PATENT OFFICE.

NORMAN W. STORER, OF PITTSBURGH, PENNSYLVANIA, ASSIGNOR TO WESTINGHOUSE ELECTRIC & MANUFACTURING COMPANY, A CORPORATION OF PENNSYLVANIA.

MEANS FOR REDUCING COMMUTATOR-FLASHING IN ROTARY CONVERTERS.

1,392,088. Specification of Letters Patent. Patented Sept. 27, 1921.

Application filed March 13, 1918, Serial No. 222,083. Renewed July 9, 1921. Serial No. 483,607.

*To all whom it may concern:*

Be it known that I, NORMAN W. STORER, a citizen of the United States, and a resident of Pittsburgh, in the county of Allegheny and State of Pennsylvania, have invented a new and useful Improvement in Means for Reducing Commutator - Flashing in Rotary Converters, of which the following is a specification.

My invention relates to protective systems for dynamo-electric machines, being particularly adapted for use with machines provided with alternating-current taps in the windings thereof, such, for example, as rotary converters, and it has for its object to provide a system of the character designated that shall be effective to dissipate the energy of the machine itself, upon the occurrence of an overload in the external circuit, thus minimizing or entirely obviating commuator flash-overs.

In my copending application, Serial No. 203,527, filed Nov. 23, 1917, I have described and claimed a protective system for direct-current generators of the commutator type wherein, upon the occurrence of a predetermined overload in the external circuit, the circuit breakers are opened and a plurality of points in the armature winding are quickly interconnected, either directly or through an impedance device of one form or another. By this means, the energy magnetically and dynamically stored in the machine itself is dissipated and is, therefore, ineffective in the production and maintenance of flash-overs.

In applying a system of the character described to rotary converters, one is confronted by the fact that, if a closed circuit be established across those points of the armature winding which are in connection with the alternating-current supply, a closed circuit will also be established across the supply mains, leading to disastrous results.

I find that, by interconnecting points in the winding of a rotary converter substantially mid-way between the alternating-current taps, an interconnection may be made which accomplishes the desired result, the inherent impedance of the armature winding being sufficient to prevent the withdrawal of abnormal amounts of current from the supply system.

I may further provide a rotary converter embodying my invention with automatic starting mechanism whereby, upon the occurrence of an overload, the machine is temporarily removed from circuit, its self-contained energy dissipated to remove the danger of flash-over and the machine thereupon reintroduced into the system for normal operation.

The single figure of the accompanying drawing is a diagrammatic view of a rotary converter and auxiliary devices embodying my invention.

Referring to the drawing for a more detailed understanding of my invention, a rotary converter 1 embodies a winding 2 provided with equi-spaced taps 3, 4 and 5 connected to slip rings 6. The slip rings 6, in turn, are connected to alternating-current supply mains 7—7 through suitable brushes 8 and leads 9 and through the proper elements of a starting apparatus indicated diagrammatically at 10. Direct current is taken from the winding 2 by suitable brushes 11 and 12 and supplied to suitable load mains 13, the direct-current leads also passing through the starting apparatus 10.

Auxiliary slip rings 14—14, with which the machine 1 is provided, are connected to points mid-way between the respective alternating-current tap points by taps 15, 16 and 17. Suitable brushes 18 bear upon the slip rings 14 and lead to suitable contact members 19 of an electromagnetically actuated switching device 20 having an actuating coil 21 in circuit with one of the direct-current mains. The arrangement is such that, upon the occurrence of an abnormal current in the load mains, a core 22 of the device 20 is drawn upwardly to effect engagement of a bridging member 23 with the contact terminals 19 and thus interconnect the brushes 18 and the tap points 15, 16, 17 of the armature winding, all as described in detail in my aforesaid application.

The switch 20 is further provided with lower contact members 24—24 in circuit with the automatic starting apparatus 10 and adapted to coact with the member 23 of the switch and is also provided with a dash-pot 25 which is effective only when the members 22 and 23 move downwardly to close a valve 26. A circuit breaker 27 is provided in connection with the alternating-current supply circuit and is adapted to open when the current therein becomes excessive. Another breaker 28 is connected, in like manner, in the direct-current load circuit.

Upon the occurrence of an abnormal overload, the direct and alternating-current breakers 28 and 27, respectively, are opened to disconnect the rotary converter from the supply and load systems and permit it to drop out of synchronism. The occurrence of the overload also causes upward movement of the core member 22 of the switch 20 to establish a closed circuit for the armature. Upon the cessation of direct-current flow, the core member 22 slowly descends, as permitted by the dash-pot 25, and finally establishes a connection between the contact members 24 to permit the initiation of steps within the automatic starting apparatus 10 for again placing the rotary converter in service.

I contemplate the use of no specific type of automatic starting apparatus, as any of those disclosed in the prior art are adapted for use, such, for example, as that shown in an article by Allan and Taylor appearing on page 2159 et seq. of the *Proceedings of the American Institute of Electrical Engineers* for Sept. 1915, and entitled "Electromagnetically controlled substations."

While I have shown my invention in its preferred form, it will be obvious to those skilled in the art that it is susceptible of various minor changes and modifications without departing from the spirit thereof and I desire, therefore, that only such limitations shall be placed thereupon as are imposed by the prior art or are specifically set forth in the appended claims.

I claim as my invention:

1. The combination with a rotary converter, of means for automatically interconnecting points in the armature winding thereof upon the flow of abnormal load current therefrom.

2. The combination with a rotary converter, of means for automatically interconnecting points in the armature winding thereof, other than the main alternating-current tap-points, upon the flow of abnormal load current therefrom.

3. The combination with a rotary converter, of means for automatically interconnecting points in the armature winding thereof of differing phase upon the flow of abnormal load current therefrom.

4. The combination with a rotary converter, of means for automatically interconnecting points in the armature winding thereof of differing phase, other than the main alternating-current tap-points, upon the flow of abnormal load current therefrom.

5. The combination with a rotary converter, of means for automatically interconnecting points in the armature winding thereof substantially mid-way between the main alternating-current taps, upon the flow of abnormal load current therefrom.

6. The combination with a rotary converter, of means for automatically interconnecting points in the armature winding thereof substantially mid-way between the main alternating-current taps upon the flow of abnormal load current therefrom, a direct-current circuit-breaker in circuit with said converter, and means for opening said interconnection upon the operation of said breaker.

7. The combination with a rotary converter, of means for automatically dissipating a portion of the magnetically stored energy thereof upon the flow of abnormal load current therefrom, said means tending to withdraw the converter from service, and means for then again synchronizing said machine and for restoring it to service.

8. The combination with a rotary converter, of means for interconnecting points of different phase in the armature winding thereof upon the flow of abnormal current therefrom, said means tending to withdraw the converter from service, whereby a portion of the magnetically stored energy thereof is dissipated, means for then opening said interconnection, and means for thereafter automatically synchronizing said machine and for restoring it to service.

9. The combination with a rotary converter, of means for automatically interconnecting points in the armature winding thereof substantially mid-way between the main alternating-current tap points, upon the flow of abnormal load current therefrom, said means tending to withdraw the converter from service, means for then opening said interconnection, and means for then automatically synchronizing said machine and for restoring it to service.

In testimony whereof, I have hereunto subscribed my name this 28th day of Feb. 1918.

NORMAN W. STORER.